United States Patent
Currie

(10) Patent No.: US 10,122,748 B1
(45) Date of Patent: Nov. 6, 2018

(54) NETWORK PROTECTION SYSTEM AND THREAT CORRELATION ENGINE

(71) Applicant: InsCyt, LLC, Overland Park, KS (US)

(72) Inventor: Thomas J. Currie, Olathe, KS (US)

(73) Assignee: InsCyt, LLC, Overland Park, KS (US)

( * ) Notice: Subject to any disclaimer, the term of this patent is extended or adjusted under 35 U.S.C. 154(b) by 445 days.

(21) Appl. No.: 14/832,235

(22) Filed: Aug. 21, 2015

(51) Int. Cl.
*G06F 17/30* (2006.01)
*H04L 29/06* (2006.01)

(52) U.S. Cl.
CPC .... *H04L 63/1433* (2013.01); *G06F 17/30876* (2013.01); *H04L 63/1416* (2013.01); *H04L 63/1425* (2013.01); *H04L 63/1441* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 8,112,485 B1* | 2/2012 | Cooley | G06Q 10/107 709/206 |
| 8,479,297 B1* | 7/2013 | Edukulla | H04L 63/1433 713/188 |
| 9,350,757 B1* | 5/2016 | Falkowitz | H04L 63/145 |
| 9,800,605 B2* | 10/2017 | Baikalov | H04L 63/1408 |
| 2009/0030756 A1* | 1/2009 | Riley | G06Q 10/063 705/7.11 |

* cited by examiner

*Primary Examiner* — William S Powers
(74) *Attorney, Agent, or Firm* — Hovey Williams LLP

(57) ABSTRACT

A network protection system and method for processing of network traffic between one or more networked devices. The network protection system may include the networked devices and a threat correlation device. The networked devices may operate as a monitoring agent and/or an interdiction agent. The threat correlation device may execute computer code for receiving information from the monitoring agent regarding an event recognized by the monitoring agent, retrieving an event score for the event from a risk scoring database based on an event type, a destination of the event, and a number of occurrences of the event, and updating a risk score by adding the event score to the risk score. When the risk score reaches a critical threshold, the threat correlation device may send instructions to the interdiction agent to take protective or defensive action against data traffic of that event type and from that aggressor.

20 Claims, 3 Drawing Sheets

NETWORK PROTECTION SYSTEM AND THREAT CORRELATION ENGINE

BACKGROUND

Computer networks are increasingly prone to attacks from malicious hackers, even as the number of companies and their degree of reliance on these computer networks to store and maintain vital work product, communications, data, money accounts, and other sensitive information or items is rising. Often, attacks on computer networks can include the destruction or theft of such vital items and sensitive information, causing substantial loss to the company, its clients, and/or its employees. Instances of blackmail resulting from stolen data or secrets similarly cause substantial losses to companies and individuals. Thus, companies and people often employ various network security measures to prevent and/or mitigate the loss due to attacks or theft on their computer networks.

In some cases, the probability and magnitude of the potential loss have caused companies and individuals to take out insurance policies to mitigate any losses due to attacks on their computer networks or computer systems. Some of these insurance companies require or offer incentives to their policyholders to implement strong network security measures in order to minimize losses that the insurance companies may be obligated to cover.

Existing security products may provide scores to a potentially hostile event with a simple pass/fail mechanism, which does not provide a sufficiently rich vocabulary for describing the fluid and analog nature of security risk scoring. In order to avoid false alarms, existing scoring and ranking technologies raise the threshold score for reporting an attack.

Unfortunately, the binary nature of existing risk scoring technologies and methods can allow real attacks which are far below the score of the false-alarm (false positive) threshold to go undetected or unreported. As a result, businesses and people's networks, computer systems, and contents thereof are vulnerable to these undetected and unreported real attacks.

The background discussion is intended to provide information related to the present invention which is not necessarily prior art.

SUMMARY OF THE INVENTION

Embodiments of the present invention solve the above-mentioned problems and provide a distinct advance in the art of computer network security and threat detection.

One embodiment of the invention includes a network protection system having one or more networked devices and a threat correlation device communicably coupled with the networked devices. The networked devices may operate as a monitoring agent and/or an interdiction agent. The monitoring agent may be or may include monitoring devices, event sensors, and monitoring software executable on the networked devices. The monitoring agent monitors data traffic and recognizes aggressor events that are potential threats. The threat correlation device may include a processor and a memory storage device. A computer program may be stored in the memory storage device for execution by the processor. Specifically, the computer program may include code segments for: receiving information from the monitoring agent regarding an event recognized by the monitoring agent, retrieving an event score for the event from a risk scoring database based on an event type, a destination of the event, and a number of occurrences of the event, and updating a risk score stored in an aggressor threat database by adding the event score to the risk score. The risk score may be associated with the aggressor and the event type in the aggressor threat database. The computer program may also include a code segment for sending, when the risk score is at or above a critical threshold, instructions to the interdiction agent to take protective action or to execute a defensive response associated with at least one of data traffic of the event type and data traffic from the aggressor.

Another embodiment of the invention may include a non-transitory computer-readable storage medium with an executable program stored thereon for processing of network traffic between one or more networked devices. At least one of the networked devices may be a monitoring agent configured to monitor data traffic and recognize aggressor events that are potential threats, while another or a same one of the networked devices may be an interdiction agent. The computer program may include code segments for receiving information from the monitoring agent regarding an event recognized by the monitoring agent and retrieving an event score for the event from a risk scoring database. Retrieving the event score may include looking up a risk scoring matrix in the scoring database associated with an event type of the event and determining the event score from the risk scoring matrix based on a destination of the event and a number of occurrences of the event. Specifically, the risk scoring matrix may include different event score values for different combinations of a number of destinations of the event and a number of occurrences of the event. The computer program may also include code segments for updating a risk score stored in an aggressor threat database and sending instructions to the interdiction agent when the risk score is at or above a critical threshold. The risk score may be updated by adding the event score to the risk score. The risk score may be associated in the aggressor threat database with the aggressor and the event type. The instructions may command the interdiction agent to take protective action or to execute a defensive response associated with data traffic that is both of the event type and from the aggressor.

Yet another embodiment of the invention includes a computer-implemented method for processing of network traffic between one or more networked devices. At least one of the networked devices may be a monitoring agent to monitor data traffic and recognize aggressor events that are potential threats, while another or a same one of the networked devices may be an interdiction agent. The method may include the processor of a threat correlation device performing the following steps: receiving information from the monitoring agent regarding an event recognized by the monitoring agent, retrieving an event score for the event from a risk scoring database, and updating a risk score in an aggressor threat database using the event score. The event score may be retrieved by looking up a risk scoring matrix in the scoring database associated with an event type of the event and determining the event score from the risk scoring matrix based on a destination of the event and a number of occurrences of the event. The risk scoring matrix may include different event score values for different combinations of a number of destinations of the event and a number of occurrences of the event. Updating the risk score may be accomplished by adding the event score to the risk score. The risk score may be associated in the aggressor threat database with the aggressor and the event type. The method may also include a step of the processor decrementing the risk score by a predetermined amount upon the passage of a predetermined amount of time or upon receiving a predetermined amount of data traffic, to avoid false positives. The method may further comprise a step of, when the risk score is at or above a critical threshold, sending instructions from the processor to the interdiction agent to take protective action or to execute a defensive response associated with data traffic that is both of the event type and from the aggressor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
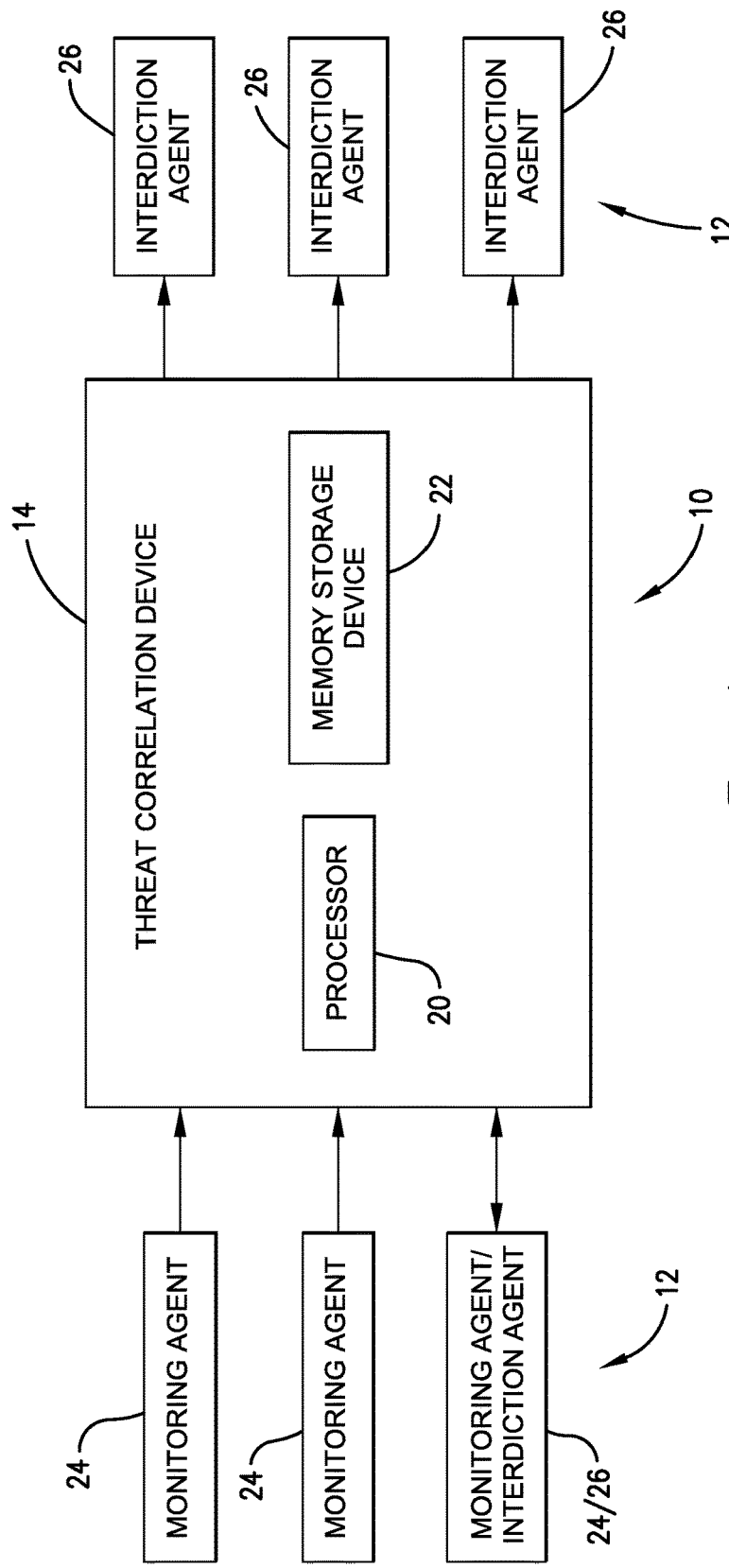
FIG. 1 is a schematic block diagram of a network protection system constructed in accordance with embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A network protection system 10, constructed in accordance with various embodiments of the current invention, is shown in FIG. 1. The network protection system 10 may be configured for quantitatively identifying a level of risk exposure that a detected event or aggressor presents, while minimizing or eliminating false positives when monitoring received data and communications with any number of networked devices 12. The system 10 and methods described herein overcome problems specifically arising in computer technology by using a solution necessarily rooted in computer technology. Accordingly, the network protection system 10 and any method steps performed thereby may be implemented in hardware, software, firmware, or combinations thereof.

Figure 2:
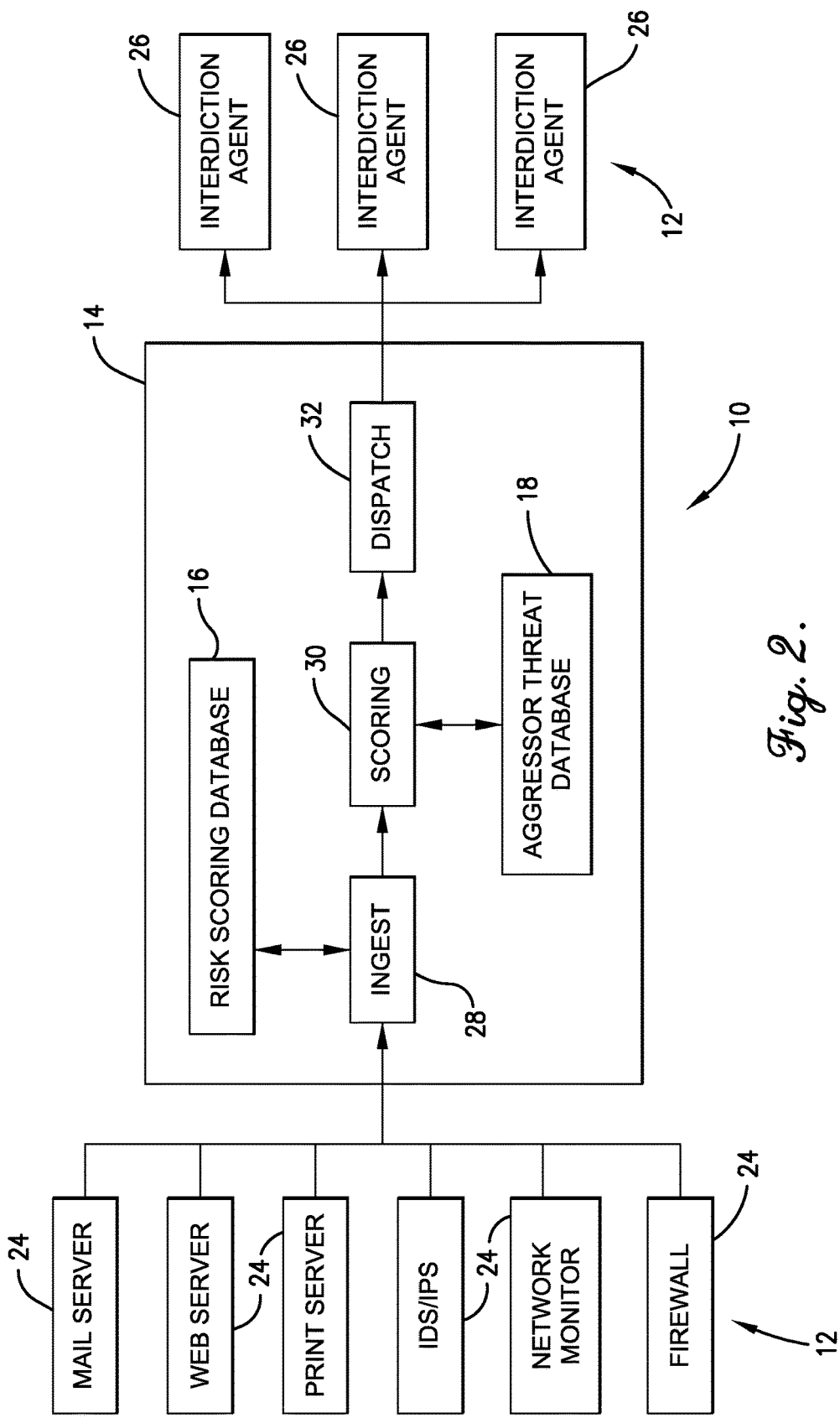
FIG. 2 is a schematic flow diagram of the network protection system and computer program segments operating thereon.

Specifically, as illustrated in FIGS. 1 and 2, the network protection system 10 may include any number of the networked devices 12 and/or at least one threat correlation device 14 configured to monitor, score, and/or output warning or command signals regarding a particular event and/or aggressor, as later described herein. The networked devices 12 may include monitoring agents 24 and/or interdiction agents 26, as described below. The network protection system 10 may further comprise and/or be communicably coupled with one or more databases, such as a risk scoring database 16 and/or an aggressor threat database 18, as described below and illustrated in FIG. 2.

The networked devices 12 may include, for example, workstation computers, desktop computers, laptop computers, palmtop computers, notebook computers, tablets or tablet computers, smartphones, mobile phones, cellular phones, personal digital assistants (PDAs), and the like. The networked devices 12 may additionally or alternatively comprise servers such as application servers, database servers, file servers, mail servers, print servers, web servers, routers, switches, or the like, or combinations thereof. In some embodiments of the invention, the networked devices 12 may additionally or alternatively comprise monitoring programs, monitoring devices, and/or event sensors, such as intrusion detection systems (IDS), intrusion prevention systems (IPS), network monitors, system loggers, firewalls, or the like. The networked devices 12 may communicate with the network protection system 10 via wired or wireless communication using any communication networks and/or communication protocols known in the art.

At least some of the networked devices 12 may include processors, memory, and the like. In some embodiments of the invention, at least some of the networked devices 12 may include various types of servers or the like, such as application servers, database servers, file servers, mail servers, print servers, web servers, or the like, or combinations thereof, implemented in a dedicated network or an open network like the World Wide Web or a cloud network. The networked devices 12 may also be configured to include or execute software such as database applications, web server applications, file server applications, mail server applications, or the like.

As noted above, the networked devices 12 may be monitoring agents 24 and/or interdiction agents 26. The monitoring agents 24 may be any of the networked devices 12 or their associated software and/or firmware described herein that are configured and/or programmed to monitor data traffic, monitor system logs, and to recognize aggressor events that may be a threat to various networked devices if sent thereto and/or allowed to run thereon. For example, as known in the art, monitoring programs, monitoring devices, and/or event sensors such as intrusion detection systems (IDS), intrusion prevention systems (IPS), network monitors, system loggers, firewalls, are configured to recognize events from aggressors.

Any quantity of monitoring agents 24 may be communicably coupled with the threat correlation device 14, and the monitoring agents 24 may also be located at geographically diverse locations to enhance observational capabilities of the network protection system 10. For example, if the same type of event from the same aggressor is recognized by multiple different monitoring agents and each of these diverse monitoring agents 24 sends this information to the threat correlation device 14, the threat correlation device 14 may recognize that a seemingly innocuous network event is but one small component of a geographically disperse and sophisticated attack. Thus, the threat correlation device 14 can dispatch instructions to accurately neutralize a developing or developed threat, as later described herein.

The interdiction agents 26, sometimes referred to as mitigation agents, may be any of the networked devices 12 and or other such devices configured for determining and executing a protective action or defensive response based on output received by the threat correlation device 14, as later described herein. In some embodiments of the invention, the interdiction agents 26 may comprise and/or be communicably coupled with at least one response database which may store variables associated with how to respond and where such responses should be sent when the threat correlation device 14 provides a critical or above-critical score to an event and/or an aggressor. For example, the response database may store thereon threshold scores at which an alert should be output to a device and/or a user thereof, threshold scores at which traffic to and from a specific aggressor should be shunned entirely, information regarding which recipients or devices should be notified of a critical or above-critical score associated with particular events and/or particular aggressors, and other such variables, thresholds, decision-making information, and/or routing information. In some embodiments of the invention, a plurality of thresholds may be stored for any one combination of event type and aggressor, with these thresholds corresponding to increasingly enhance protective actions or defensive responses.

In some embodiments of the invention, one of the monitoring agents 24 may also be one of the interdiction agents 26. For example, a firewall may detect and provide a particular event to the threat correlation device 14 and then the threat correlation device 14 may indicate to the firewall that a protective action or defensive response is needed, such as the firewall shunning all traffic to and from the aggressor associated with that particular event. In this example, the firewall is acting as both the monitoring agent 24 and the interdiction agent 26.

The threat correlation device 14 may comprise any combination of hardware, software, and/or firmware operated thereon for performing some or all of the method steps described below. In some embodiments of the invention, the threat correlation device 14 may comprise at least one processor 20 and/or at least one memory storage device 22. Furthermore, the threat correlation device 14 may be configured for wired or wireless communication with one or more of the networked devices 12 described above. For example, the threat correlation device 14 may be a plug-in type device configured to be plugged into a server or other networked devices. Additionally or alternatively, the threat correlation device 14 may be communicably coupled between two or more networked devices 12 or between various communicably coupled components of one of the networked devices 12.

In some embodiments of the invention, the threat correlation device 14 may include one or more broadband wireless transmitters and receivers for communicating wirelessly via radio frequency (RF) communication including cellular or mobile phone standards such as 3G or 4G, Institute of Electrical and Electronics Engineers (IEEE) 802.11 standards for wireless networking, Bluetooth™ standards, and the like. Additionally or alternatively, threat correlation device 14 may include one or more transmitter and receiver circuits for transmitting and receiving data through metal conductor cables, wires, and connectors or optical fiber cables, or the like.

The processor 20 may include microprocessors, microcontrollers, digital signal processors (DSPs), field-programmable gate arrays (FPGAs), analog and/or digital application-specific integrated circuits (ASICs), other electronic circuitry, wires, communication ports, communication busses, and the like, or combinations thereof. The processor 20 may generally execute, process, or run instructions, code, software, firmware, programs, applications, apps, services, daemons, or the like, or may step through states of a finite-state machine.

The memory storage device 22 may include data storage components such as read-only memory (ROM), programmable ROM, erasable programmable ROM, random-access memory (RAM), hard disks, hard disk drives, solid state drives, tape, floppy disks, optical disks, flash memory, SD, thumb drives, universal serial bus (USB) drives, and the like, or any combinations thereof. The memory storage device 22 may include, or may constitute, a "computer-readable medium". The memory storage device 22 may store instructions, code, software, firmware, programs, applications, apps, services, daemons, or the like that are executed by the processor 20. The memory storage device 22 may also store one or more of the databases described herein. The processor 20 may be in communication with the memory storage device 22 through address busses, data busses, control lines, and the like.

The threat correlation device 14 may further comprise one or more computer programs stored in or on computer-readable medium residing on or accessible by the threat correlation device 14. For example, the memory storage device 22 and/or the databases described herein may comprise computer programs and may be considered computer-readable mediums, as define herein. The computer programs may comprise listings of executable instructions for implementing logical functions in the threat correlation device 14, such as via the processor 20, and can be embodied in any non-transitory computer-readable medium, such as the memory storage device 22, for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The risk scoring database 16 may be located on the memory storage device 22, located in the aggressor threat database 18, or located on any data storage devices known in the art, internal or external to the threat correlation device 14. The risk scoring database 16 may comprise or store thereon numeric event scores or a risk scoring matrix assigned to each of a plurality of event types that could be received from or correspond to any plurality of aggressors or sources. An event may be defined herein as any detectable or identifiable occurrence or risk alert that has significance for a systems hardware or software. For example, the events may include a program loading onto one of the networked devices 12, which may result in a risk alert. As another example, the event may include observation of a network packet or datagram, which may result in a risk alert. In yet another example, the event may be associated with data received from a system log or the like. The event score may be defined herein as being associated with a probability of loss if the activity or event is allowed. For example, the risk scoring database 16 may comprise a risk scoring matrix of event scores for each of more than 44,000 event types. However, any quantity of event scores or risk scoring matrices may be stored therein without departing from the scope of the invention. As later described herein, the risk scoring matrix for each event type may be used to look up the event score for a given event based on how many targets (destination of event) and how many times the event is repeated. A count for each of the event types may also be stored in the risk scoring database 16 and updated by the threat correlation device 14, as described below. The risk scoring database 16 may also be configured to be periodically and/or continuously updated to account for new types of events or risks or to update a score associated with already existing event, risks, or aggressors. For example, the risk scoring database 16 may receive, download, or be loaded with static research and risk probability calculations from computer networking analysts for existing event types and any new types of events or risks. The research and risk probability calculations may also be dynamically updated by computer networking analysts and downloaded by or pushed to update the risk scoring database 16.

The aggressor threat database 18 may be located on the memory storage device 22, located in the risk scoring database 16, or located on any data storage devices known in the art, and may comprise one or more risk scores for one or more event types and associated aggressors. An aggressor may be defined herein as a source of one or more events, and may be identified via various identification information, such as an IP address, MAC address, or another type of network address, characteristics, or identifier capable of identifying an event source. Each risk score may be updated as new events are received by the threat correlation device 14. For example, the event score may be added to the risk score and stored in the aggressor threat database 18 as an updated risk score. The aggressor threat database 18 may also comprise one or more critical thresholds stored therein for comparison to the updated risk scores for the one or more aggressors. Different threshold scores may be associated with different event types, different aggressor types, and/or other variables.

In some embodiments of the invention, as illustrated in FIG. 2, a computer program of the present invention may be separated into an ingest engine 28, a scoring engine 30, and a dispatch engine 32, executable by and/or stored by the threat correlation device 14. For example, in some embodiments of the invention, the ingest engine 28, scoring engine 30, the dispatch engine 32, the risk scoring database 16, and/or the aggressor threat database 18 may be included with, retained by, or executed on the threat correlation device 14. However, in other embodiments of the invention, one or more of the ingest engine 28, scoring engine 30, the dispatch engine 32, the risk scoring database 16, and/or the aggressor threat database 18 may be physically separated or isolated from each other, while still remaining communicably coupled as described herein. Any of these computer program and/or data segments and/or the method steps performed thereby may be combined into a single threat correlation engine or threat correlation computer program, or alternatively divided into any plurality of segments without departing from the scope of the invention.

The ingest engine 28 may be configured and/or programmed to receive input from one or more of the networked devices 12, such as the monitoring agents 24 described above. For example, the ingest engine 28 may receive a new event reported by any intrusion detection systems (IDS), intrusion prevention systems (IPS), network monitors, system loggers, firewalls, or other such monitoring programs, monitoring devices, or event sensors associated with one or more of the networked devices 12. In some example embodiments of the invention, the ingest engine 28 may be configured to determine and/or receive the following event information from a plurality of different types of sources—Event_Id: a value identifying which event type has been observed; Monitor_Id: an identifier assigned to each monitoring agent 24 associated with received events; Source_Address: the IP address or network address of the source of the event (e.g., the aggressor); Destination_Address: IP address or other type of network address of a destination of the event (e.g., the target); and Count: a number of occurrences of a particular event within a particular period of time. Note that the IP address or other type of network address may include a direction, target, IPV4, IPV6, MAC address, or any other type of network address without departing from the scope of the invention. Similarly, the ingest engine 28 may be configured to determine and/or receive any information required, or otherwise desirable to allow or enhance the operation of the network protection system 10 or threat correlation device 14.

Using this event information, the ingest engine 28 may also be configured and/or programmed to retrieve input from the risk scoring database 16, such as event scores or information for determining event scores associated with the particular types of events reported to or received by the ingest engine 28. The event scores may also be determined based on the destination address(es) and/or the count (e.g., the number of occurrences) using the risk scoring matrix for the particular event type. The count may be tracked for a given event type via the ingest engine 28 and/or the monitoring agent 24 that reported the events. For example, the risk scoring database 16, in addition to the risk scoring matrices stored therein, may also be used to track/store a count for a particular event from a particular source or aggressor. Similarly, in additional or alternative embodiments of the invention, other counts may be tracked for a given aggressor, given target, or the like, and may also be used along with the risk scoring matrix to determine event scores. The ingest engine 28 may further be configured to send event scores, determined as described below, to the scoring engine 30.

In some embodiments of the invention, the risk scoring matrix in the risk scoring database 16 may group events based on a number of targets (e.g., destinations or Destination_Address) and a number of events (e.g., the Count) for each event type detected. The number of groups in the risk scoring matrix may be varied based on a desired granularity of the risk scores. Furthermore, other variables may be included in the risk scoring matrix without departing from the scope of the invention. In one embodiment of the invention, as illustrated in Table 1 below, if an event is directed to one target one time, it may be assigned a BaseScore (B) from that event type's risk scoring matrix. If an event is directed to more than one target one time, then it may be assigned a RepeatScore (Br) from that event type's risk scoring matrix. If an event is directed to three or more targets one time, then it may be assigned a MultiScore (Bm) from that event type's risk scoring matrix. If an event is directed to one target more than once, it may be assigned a SingleRepeat (R) score from that event type's risk scoring matrix. If an event is directed to more than one target more than once, then it may be assigned a RepeatRepeat (Rr) score from that event type's risk scoring matrix. If an event is directed to three or more targets more than once, then it may be assigned a MultiRepeat (Rm) score from that event type's risk scoring matrix. If an event is directed to one target three or more times, it may be assigned a SingleBurst (S) score from that event type's risk scoring matrix. If an event is directed to one target three or more times, it may be assigned a RepeatBurst (Sr) score from that event type's risk scoring matrix. If an event is directed to three or more targets three or more times, then it may be assigned a MultiBurst (Sm) score from that event type's risk scoring matrix.

TABLE 1

|  | One time | More than once | Three or more times |
|---|---|---|---|
| One target | BaseScore (B) | SingleRepeat (R) | SingleBurst (S) |
| More than one target | RepeatScore (Br) | RepeatRepeat (Rr) | RepeatBurst (Sr) |
| Three or more targets | MultiScore (Bm) | MultiRepeat (Rm) | MultiBurst (Sm) |

Note that three or more targets and three or more times in the table above could be changed to any quantity beyond two without departing from the scope of the invention. For example, a first target of the event may be given a BaseScore (B), and if a second target of the event is identified, the resulting event score may be RepeatScore (Br). Then for a third, fourth, fifth, and/or sixth target identified, no score may be output, but for a seventh identified target, an event score of MultiScore (Bm) may be output. Thus, an event count (number of times the event occurs) and/or a number of targets of the event required to output one or more of the score values from the table above may be set at any desired threshold quantity. This also means that the risk score, which may be incremented by the event score, as described below, may not always increase with each subsequent occurrence of the event and/or with each subsequent target, if that number of occurrences or number of targets is not represented in the corresponding risk scoring matrix.

The scoring engine 30, as defined herein, may be configured for updating a risk score stored in the aggressor threat database 18 using one or more event scores sent by the ingest engine 28 to the scoring engine 30. For example, when event scores associated with a particular aggressor are received, those event scores may be added to a previous risk score for that specific aggressor and that specific event type.

For a single aggressor, the aggressor threat database 18 may store a plurality of risk scores each associated with different types of events sent by or otherwise associated with that particular aggressor. In some embodiments of the invention, the risk score calculated by the scoring engine 30 may be calculated using the following Equation 1:

$$\text{risk score} = \Sigma(B+R+S+Br+Rr+Sr+Bm+Rm+Sm) \quad (1)$$

Where the event score value associated with each variable remains zero until a count or a number of targets indicates that its corresponding value in the risk scoring matrix for that event type should be used. For example, if the count and number of targets is 1, the value B for that event type as retrieved from the risk scoring matrix equals the risk score. Then, if the count is 2 and the number of targets is still 1, the risk score is updated to equal the value B plus the value R for that event type as retrieved from the risk scoring matrix. Thus, the scoring engine 30 may be configured to operate as an accumulator as new events are processed through the ingest engine 28.

Equation 1 or any other suitable risk score calculation algorithm may be stored in the aggressor threat database 18 and/or the memory storage device 22 and may be executed on the processor 20 or other such processing devices associated with the scoring engine 30, as described herein. In one embodiment of the invention, the risk scores may be placed on a scale from 0 to 10. A risk score of 0 would indicate that an event and/or aggressor is not hostile. A risk score of 10 may indicate an immediate and acute risk of loss, requiring an immediate blocking of any data from the associated aggressor. The risk scores may increase with respect to a probability and/or magnitude of loss, or any other suitable metric.

The risk score for any event types and corresponding aggressors may be retrieved from the aggressor threat database 18 by the scoring engine 30, along with at least some of the identification information described above, and compared to a critical threshold value associated therewith and/or compared to a plurality of different thresholds corresponding to increasingly enhanced protective actions or defensive responses. Different threshold values may be provided for different event types or aggressors and/or one critical threshold value may be used for a plurality of event types or aggressors or all of the event types. The critical threshold(s) or any thresholds to which the risk scores are compared may be stored in the aggressor threat database 18 and/or the memory storage device 22 or any memory storage device accessible by the processor 20. Various risk scores may then be passed along to the dispatch engine 32 if any particular risk scores are above any threshold values or the critical threshold, as later described herein. For example, output from the scoring engine 30 to the dispatch engine 32 may include the following—Event_Number: an index to the event which triggered the risk score to match or surpass the critical threshold; Aggressor_Address: the address of the aggressor associated with the risk score; and Score: the accumulated risk score associated with this event and the aggressor.

In some embodiments of the invention, the risk scores in the aggressor threat database 18 may also be decremented a predetermined amount by the scoring engine 30 based on the passage of a particular amount of time (minutes, seconds, etc.) or other parameters, such as data flow through the threat correlation device 14. Additionally or alternatively, the aggressor threat database 18 may be configured to indicate if a particular aggressor is whitelisted, meaning risk scores for that aggressor never change, regardless of the number of events, targets, or any other variable used in the risk scoring matrix.

The dispatch engine 32 may continually and/or periodically look up or track scores in the aggressor threat database 18 to determine if any of the aggressor's risk scores has reached or surpassed any thresholds associated therewith. For example, one or more of the interdiction agents 26 may be configured to pull information regarding aggressors and/or events having critical level risk scores continuously, periodically, and/or on command. Alternatively, the dispatch engine 32 may be configured to push information regarding aggressors and/or events having critical level scores continuously, periodically, and/or upon receipt of said critical level scores, such as, for instance, upon activation of a trigger in the aggressor threat database 18. If one of the risk scores has reached a critical level (e.g., is greater than a particular threshold score), the dispatch engine 32 may implement appropriate protective action or defensive response by notifying one or more of the interdiction agents 26 or otherwise creating an external alert processing event to deal with the aggressor. In some embodiments of the invention, the dispatch engine 32 may be configured to look up which interdiction agents 26 to notify based on a number of variables described herein, such as the type of event, the associated aggressor, the target or destination of the event, and the risk score itself. Such information may be stored in any of the databases described herein, in the memory storage device 22, and/or any threat response database communicably coupled with the threat correlation device 14.

In some embodiments of the invention, this protective action may include anything from alarms provided to a user up to and including shunning all network traffic to and from the aggressor associated with the event that has reached the critical level. A type of protective action or defensive response may be programmed to be dependent on a variety of factors, such as the type of event, the specific value of the updated risk score, the type of aggressor, or any other monitored characteristics. In some embodiments of the invention, when the critical level is reached, the dispatch engine 32 is configured to provide instructions or rules to the monitoring programs, monitoring devices, or event sensors associated with one or more of the networked devices 12, thus implementing certain actions up to and including shunning all traffic to and from that aggressor, thereby isolating and/or neutralizing that aggressor.

Figure 3:
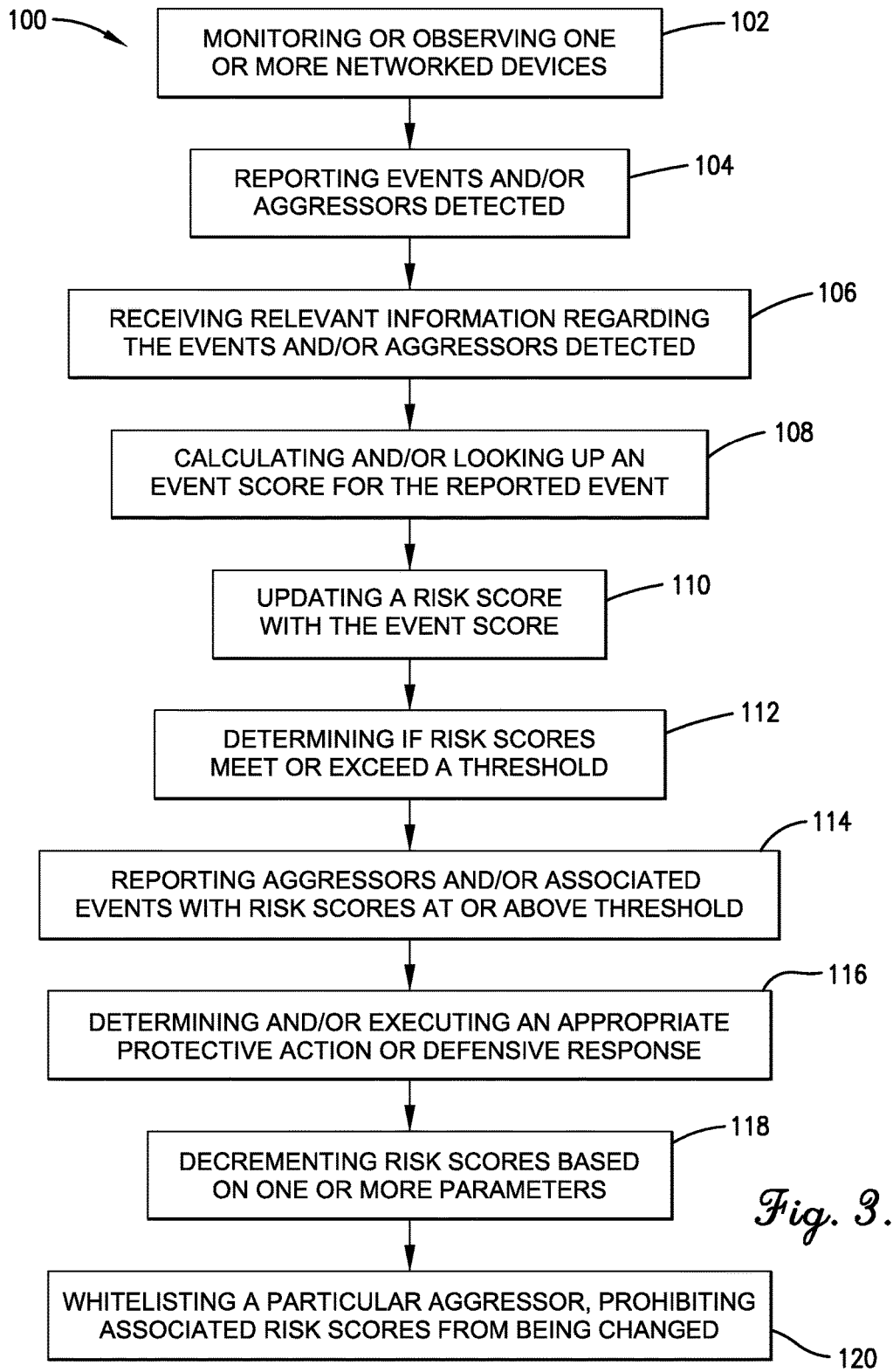
FIG. 3 is a flow diagram of method steps for scoring and processing of network traffic in accordance with embodiments of the present invention.

A method 100 for quantitatively identifying the level of risk exposure that an aggressor presents to one or more networked devices while minimizing or eliminating false positives, in accordance with various embodiments of the present invention, is shown in FIG. 3 and described in more detail below. The steps of the method 100 may be performed in the order as shown in FIG. 3, or they may be performed in a different order. Furthermore, some steps may be performed concurrently as opposed to sequentially. In addition, some steps may not be performed. Some of the steps may represent code segments or executable instructions of the computer program or applications described above.

The method 100, as illustrated in FIG. 3, may comprise the steps of monitoring or observing one or more networked devices, as depicted in block 102, and reporting events and/or aggressors detected, as depicted on block 104, along with any relevant information related to the event and/or aggressors. The monitoring and reporting steps, 102 and 104, may be performed by one of the monitoring agents 24 or other networked devices 12 described herein.

The method 100 also comprises a step of receiving relevant information regarding the events and/or aggressors detected, as depicted in block 106, such as with the ingest engine 28 and/or the threat correlation device 14. Specifically, as described above, the relevant information about the reported event may include, for example: an event identifier that identifies the event type, a monitoring agent identifier, a source address of the aggressor or a source of the event, a destination address identifying a target or destination of the event, and a count identifying a running total of a number of occurrences of the event.

Next, the method 100 may include a step of calculating and/or looking up an event score for the reported event, as depicted in block 108. This may be accomplished using the risk scoring matrix described above, based on information such as the number of targets (e.g., destinations) and the number of times the event occurred (e.g., the count). This step may also include incrementing the count associated with that particular event type and/or that particular aggressor.

The method 100 may then include a step of updating a risk score, as depicted in block 110, based on the event score determined in block 108. Specifically, this step may involve updating an aggressor accumulator function, such as by adding the event score to the previous risk score associated with that particular aggressor and event type, and storing this updated risk score in the aggressor threat database. However, other equations and calculations for updating the risk score based on the event score determined in block 108 may be used without departing from the scope of the invention. Typically, this updating step may involve changing a value of the risk score such that the risk score is subsequently closer in value to one of its associated thresholds.

In some embodiments of the invention, each risk score may be associated with a specific event type and a specific aggressor, such that if one of these risk scores exceeds any of the thresholds, protective action or filtering may be limited to that specific type of event from that associated aggressor, while potentially still allowing other types of events from that aggressor. Furthermore, in some embodiments of the invention, a single aggressor risk score may be calculated by combining risk scores from various event types associated with that single aggressor. If this aggressor risk score is above a certain aggressor threshold, more enhanced protective action may be requested via the dispatch engine 32, such as all traffic from that aggressor being shunned.

In one embodiment of the invention, the risk scores may be placed on a scale from 0 to 10. For example, a risk score of 0 may indicate that an aggressor and/or a specific event type received from that aggressor is not hostile, and therefore protective action is not required. The scale may increase with respect to the risk of loss due to the event and/or the associated aggressor. The necessity of protective action may increase with the scale, or the severity of the measure of the protective action may increase with the scale. For example, a risk score of 10 may indicate immediate and acute risk of loss thus requiring immediate and severe action.

The method 100 may further include a step of determining if one or more of the risk scores have reached or exceeded a threshold, as depicted in block 112, and, if so, reporting this determination to one or more of the interdiction agents 26 and/or networked devices 12, as depicted in block 114. This reporting may be communicated via push (sent by threat correlation device 14) and/or pull (retrieved by interdiction agents 26) communication methods, as known in the art. The reporting step 114 may, for example, include instructing the interdiction agent 26 to take protective action or to execute a defensive response associated with data traffic that is both of the event type and from the aggressor. Then, the method 100 may also include a step of determining and executing an appropriate protective action or defensive response, as depicted in block 116, which may be performed by one or more of the interdiction agents 26 and/or any of the networked devices 12.

The protective action may vary based on a status or demands of the network, such as its importance or volume of traffic or data, but may include anything from shutting down a network and isolating it from the aggressor, to merely placing various restriction levels on a network filter. The protective action may also include issuing an interdiction command to a mechanized incident response process or creating an external alert processing event. Another protective action may be a warning, alert, or message to an appropriate network security administrator or a display visible to pertinent personnel. As noted above, the interdiction agent 26 may also be the monitoring agent 24, such that the monitoring agent 24 sending the event to the threat correlation device 14 may also be the same networked device 12 receiving the determination that one or more of the risk scores has reached or exceeded the critical threshold, then determining and executing the appropriate protective action. For instance, a firewall may be both a monitoring agent 24 and an interdiction agent.

The method 100 may also include a step of decrementing the risk score based on one or more parameters, as depicted in block 118. For example, a frequency of decrementing the risk score may be a function of any relevant parameter including time—such as every few minutes, seconds, or other period of time—or a parameter such as traffic through or within the network or threat correlation device 14, in order to avoid false alarms. In this manner, infrequently observed potential risks may not meet or exceed any critical thresholds so that protective or defensive measures are not taken. Additionally or alternatively, decrementing the risk score may result in demilitarization of protective action or defensive response that is already occurring. For example, if an aggressor and/or an event type from a particular aggressor is being shunned based on previously meeting or exceeding an associated critical threshold, but the risk score is eventually decremented over time to below this critical threshold, lesser responses (warning alerts and the like) may be used and/or all data may again be permitted from that aggressor and/or for that event type. Then, if the aggressor and/or event type again triggers the associated risk score to meet or exceed the critical threshold, the protective action or defensive response may be reinstated.

In some embodiments of the invention, the method 100 may include a step of whitelisting a particular aggressor, as depicted in block 120, prohibiting risk scores associated with the particular aggressor from being changed indefinitely or for a selected amount of time. Storing of data indicating whitelisting of particular aggressors may be stored in the aggressor threat database 18 or any memory storage devices described herein. Thus, risk scores and/or an aggressor risk score associated with the particular aggressor being whitelisted do not increase, regardless of the number of events or targets associated therewith. Likewise, risk scores and/or an aggressor risk score associated with the particular aggressor being whitelisted do not decrease, regardless of the amount of time that passes or the amount of data traffic experienced. This may assist in preventing false positives or false alarms related to a critical event or a critical source frequently used, but that is known and expected to be relatively safe. Alternatively, this could ensure that an aggressor whose risk score(s) is unacceptably high does not have its risk score(s) decremented below that threshold, such that all data and/or a specific event from this hostile aggressor is continuously shunned, thereby effectively blacklisting the aggressor.

In some embodiments of the invention, the method 100 described above can additionally or alternatively be used to score log data or other data comprising events observed other than on a network. For instance, the monitoring agents 24 may include hardware, software, and/or firmware loggers that log events of various levels of importance for system administrator's review and/or action. In this manner, the monitoring agents 24 may generate log data including, without limitation, syslog data, server logs, mail server logs, customer machine log data, and the like that are provided to the threat correlation device 14. For example, syslog data may include a facility code, a severity level, an originator process ID, a timestamp, a hostname or IP address of a source, event description, and the like. In this manner, log data, other data, and network data each comprise an event for scoring. Tables or risk scoring matrices associated with different log information may be stored for determining the event score or, in this case, a "log data" score. This information may then be utilized in the same way as the event score above in method 100. In this manner, log data scores can augment and/or enrich the intelligence of the network protection system 10 by including additional events for scoring. For instance, log data scores may be scored to indicate less severity than network based event scores, but the sheer volume of log data scored events may give rise to actionable intelligence to be acted upon by the network protection system 10.

Examples of how the threat correlation device 14 may process particular events from particular aggressors are provided below. For simplicity, integer values are used in these examples. However, both integer and floating point values may be used interchangeably for these risk scores without departing from the scope of the invention. Furthermore, other events, event types, aggressors, and scoring schemes may be utilized without departing from the scope of the invention.

Example 1

This example is in regards to an event titled "libnet SSH BruteForce." Libnet inbound port 22 traffic is seen on monitoring agent X. The event from this external aggressor is scored B=3 (i.e., one event occurrence, one target). Future traffic of the same event type from the same aggressor is seen on monitoring agent X. This results in an event score of R=1 (i.e., more than one occurrence, one target). So the resulting risk score is now equal to these two event scores added together (i.e., risk score=4). Libnet inbound port 22 traffic is seen from the same aggressor on monitoring agent Y. The event is thus scored Br=6 (i.e., one event occurrence, more than one target). The total risk score (i.e., 3+1+6) is now equal to 10, and the threat correlation device 14 reports this as an active attacker to one or more of the interdiction agents 26, who take necessary protective action, because the risk score is equal to or greater than the critical threshold for this aggressor and event type. This example is noteworthy, because not all libnet traffic over port 22 is malicious.

Example 2

This example is in regards to an event titled "dfind recon bot." In this example, all dfind recon bot traffic is bad and corresponds to a high risk of loss. So monitoring agent X observes a client browser requests a file from a webserver. The filename is "w00tw00t". This event from this external aggressor is scored B=4. Monitoring agent X observes this same aggressor requesting a similarly named file from a different server or possibly the same server. The event from this external aggressor is scored R=6. The risk score total is 10, and the threat correlation device 14 reports this aggressor as an active attacker, and the interdiction agents 26 take necessary protective action.

Example 3

This example is also in regards to the event titled "dfind recon bot," as identified above. Again, all dfind recon bot traffic is bad. Monitoring agent X observes a client browser requests a file from a webserver. The filename is "w00tw00t". This event from this external aggressor is scored B=4. Monitoring agent Y observes this same aggressor requesting a similarly named file from a server. The event from this external aggressor is scored Br=6. The risk score total is 10, and the threat correlation device 14 reports this aggressor as an active attacker, and the interdiction agents 26 take necessary protective action.

Example 4

This example is again in regards to the event titled "libnet SSH BruteForce." Libnet inbound port 22 traffic is seen on monitoring agent X. The event from this external aggressor is scored B=3 (i.e., one event occurrence, one target). Future traffic of the same event type from the same aggressor is seen on monitoring agent X. This results in an event score of R=1 (i.e., more than one occurrence, one target). So the resulting risk score is now equal to these two event scores added together (i.e., risk score=4).

An amount of time passes and the risk score is decremented to 3. This same amount of time passes again, and the risk score is decremented to 2. Then libnet inbound port 22 traffic is seen from the same aggressor on monitoring agent Y. The event is thus scored Br=6 (i.e., one event occurrence, more than one target). However, unlike in Example 1, the risk score is now 8, which is below the critical threshold. Thus, the threat correlation device 14 does not report this aggressor as an active attacker at this time.

However, the amount of time passes twice more, and the risk score is decremented to 6. Then libnet inbound port 22 traffic is seen from the same aggressor on monitoring agent Z. The event is thus scored Bm=10 (i.e., one event occurrence, three or more targets). The risk score total is now 16, which is above the critical threshold. Thus, the threat correlation device 14 reports this aggressor as an active attacker, and the interdiction agents 26 take necessary protective action.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed is:

1. A network protection system comprising:
one or more networked devices configured to operate as at least one of a monitoring agent and an interdiction agent, wherein the monitoring agent comprises at least one of monitoring devices, event sensors, and monitoring software executable on the networked devices and configured to monitor data traffic and recognize events that are potential threats; and
at least one threat correlation device communicably coupled with the networked devices, the threat correlation device comprising a processor and at least one memory storage device, the at least one processor configured to execute a computer program stored in the memory storage device, the computer program including:
a code segment for receiving information from the monitoring agent regarding an event recognized by the monitoring agent;
a code segment for retrieving an event score for the event from a risk scoring database based on at least one of an event type, a destination of the event, and a number of occurrences of the event;
a code segment for updating a risk score stored in an aggressor threat database based upon the event score, wherein the risk score is associated with an aggressor and the event type; and
a code segment for, when the risk score is at or above at least one threshold, sending instructions to the interdiction agent to take protective action or to execute a defensive response associated with at least one of the at least one threshold, data traffic of the event type and data traffic from the aggressor.

2. The network protection system of claim 1, further comprising a code segment for decrementing the risk score by a predetermined amount upon passage of a predetermined amount of time or upon experiencing a predetermined amount of data traffic.

3. The network protection system of claim 1, wherein updating the risk score includes adding the event score to the risk score and replacing the risk score in the aggressor threat database with a resulting sum.

4. The network protection system of claim 1, wherein the protective action or defensive response comprises at least one of: shunning all data traffic from the aggressor, shunning all data traffic of the event type, and shunning all data traffic that is both of the event type and from the aggressor.

5. The network protection system of claim 1, wherein the event comprises at least one of a network based event or a log data event.

6. The network protection system of claim 1, wherein the at least one threshold includes a plurality of thresholds corresponding to increasingly enhanced protective actions or defensive responses.

7. The network protection system of claim 1, wherein the risk scoring database stores a plurality of event types and a risk scoring matrix for each of the event types, wherein the risk scoring matrix comprises different event score values for different combinations of a number of destinations of the event, and a number of occurrences of the event.

8. The network protection system of claim 1, wherein the risk scoring database comprises values for a plurality of event types, wherein the values are based on risk probability calculations for each event type.

9. The network protection system of claim 1, further comprising a code segment for incrementing a count of a particular event type corresponding to the event recognized by the monitoring agent.

10. The network protection system of claim 1, wherein the information received from the monitoring agent regarding the event includes: an event identifier that identifies the event type, a monitoring agent identifier, a source address of the aggressor or a source of the event, a destination address identifying a target or destination of the event, and a count identifying a running total of a number of occurrences of the event.

11. The network protection system of claim 1, further comprising a code segment for whitelisting an aggressor in the aggressor threat database, prohibiting risk scores associated with the particular aggressor from being changed indefinitely or for a selected amount of time.

12. A non-transitory computer-readable storage medium with an executable program stored thereon for processing of network traffic between one or more networked devices, wherein at least one of the networked devices is a monitoring agent configured to monitor data traffic and recognize aggressor events that are potential threats and another or a same one of the networked devices is an interdiction agent, wherein the program comprises:

a code segment for receiving information from the monitoring agent regarding an event recognized by the monitoring agent;

a code segment for retrieving an event score for the event from a risk scoring database by looking up a risk scoring matrix in the scoring database associated with an event type of the event and determining the event score from the risk scoring matrix based on a destination of the event and a number of occurrences of the event, wherein the risk scoring matrix comprises different event score values for different combinations of a number of destinations of the event and a number of occurrences of the event;

a code segment for updating a risk score stored in an aggressor threat database by adding the event score to the risk score, wherein the risk score is associated in the aggressor threat database with the aggressor and the event type; and a code segment for, when the risk score is at or above a critical threshold, sending instructions to the interdiction agent to take protective action or to execute a defensive response associated with data traffic that is both of the event type and from the aggressor.

13. The non-transitory computer-readable storage medium of claim 12, further comprising a code segment for decrementing the risk score by a predetermined amount upon the passage of a predetermined amount of time or upon receiving a predetermined amount of data traffic.

14. The non-transitory computer-readable storage medium of claim 12, further comprising a code segment for whitelisting an aggressor in the aggressor threat database, prohibiting risk scores associated with the particular aggressor from being changed indefinitely or for a selected amount of time.

15. The non-transitory computer-readable storage medium of claim 12, wherein the event scores stored in the risk scoring database are associated with risk probability calculations for each event type.

16. The non-transitory computer-readable storage medium of claim 12, further comprising a code segment for incrementing a count associated with the event type upon receiving the event recognized by the monitoring agent.

17. The non-transitory computer-readable storage medium of claim 12, wherein the information received from the monitoring agent regarding the event includes: an event identifier that identifies the event type, a monitoring agent identifier, a source address of the aggressor or a source of the event, a destination address identifying a target or destination of the event, and a count identifying a running total of a number of occurrences of the event.

18. A computer-implemented method for processing of network traffic between one or more networked devices, wherein at least one of the networked devices is a monitoring agent configured to monitor data traffic and recognize aggressor events that are potential threats and another or a same one of the networked devices is an interdiction agent, wherein the method comprises:

receiving, with a processor of a threat correlation device, information from the monitoring agent regarding an event recognized by the monitoring agent;

retrieving, with the processor, an event score for the event from a risk scoring database by looking up a risk scoring matrix in the scoring database associated with an event type of the event and determining the event score from the risk scoring matrix based on a destination of the event and a number of occurrences of the event, wherein the risk scoring matrix comprises different event score values for different combinations of a number of destinations of the event and a number of occurrences of the event;

updating, with the processor, a risk score stored in an aggressor threat database by adding the event score to the risk score, wherein the risk score is associated in the aggressor threat database with the aggressor and the event type;

decrementing the risk score by a predetermined amount upon the passage of a predetermined amount of time or upon receiving a predetermined amount of data traffic; and sending, when the risk score is at or above a critical threshold, instructions from the processor to the interdiction agent to take protective action or to execute a defensive response associated with data traffic that is both of the event type and from the aggressor.

19. The method of claim 18, further comprising incrementing, with the processor, a count associated with the event type upon receiving the event recognized by the monitoring agent.

20. The method of claim 18, wherein the information received from the monitoring agent regarding the event includes: an event identifier that identifies the event type, a monitoring agent identifier, a source address of the aggressor or a source of the event, a destination address identifying a target or destination of the event, and a count identifying a running total of a number of occurrences of the event.

* * * * *